United States Patent [19]
Anderson

[11] 3,860,515
[45] Jan. 14, 1975

[54] METHOD FOR CONCENTRATING MACROMOLECULES

[75] Inventor: Norman G. Anderson, Oak Ridge, Tenn.

[73] Assignee: The United States of America as represented by the United States Atomic Energy Commission, Washington, D.C.

[22] Filed: Oct. 31, 1973

[21] Appl. No.: 411,504

[52] U.S. Cl. .................... 210/22, 195/1.5, 424/89
[51] Int. Cl. ............................................. B01d 13/00
[58] Field of Search ......... 210/22, 23, 321; 195/1.5; 424/89

[56] References Cited
UNITED STATES PATENTS

| | | | |
|---|---|---|---|
| 2,692,854 | 10/1954 | Henley | 210/22 X |
| 3,357,917 | 12/1967 | Humphreys | 210/22 |
| 3,632,745 | 1/1972 | Apostolov | 195/1.5 X |

*Primary Examiner*—Frank A. Spear, Jr.
*Attorney, Agent, or Firm*—John A. Horan; David S. Zachry; John B. Hardaway

[57] ABSTRACT

A process for concentrating macromolecules by enclosing a solution or suspension of the macromolecules in a dialysis membrane container, immersing the dialysis membrane container into a bath of the solvent or suspending medium, and freezing the bath around the membrane container. The solvent or suspending medium and part of the salts of the solution are removed from the membrane by the process, thus leaving the macromolecules in a highly concentrated state within the membrane.

5 Claims, No Drawings

METHOD FOR CONCENTRATING MACROMOLECULES

BACKGROUND OF THE INVENTION

This invention was made in the course of, or under, a contract with the United States Atomic Energy Commission. It relates generally to the art of concentrating macromolecules.

Methods for concentrating macromolecules have been of great importance in both preparative and analytical biochemistry. In the past such methods have included evaporation, freezing, lyophilization, precipitation, foaming, filtration, exclusion from swelling gels, adsorption onto solid surfaces, and others. Each of these methods has disadvantages ranging from requirements for complex and expensive equipment to laborious and time-consuming handling procedures. The number and variety of concentration devices found in biochemistry laboratories demonstrate both the importance of the problem and the previous lack of satisfactory solution. Ideally, a concentration method should be relatively rapid and inexpensive. It should not require additional complicated steps to yield, for example, concentrated protein in the solution desired, nor should it fractionate the mixture being concentrated.

In the use of filtration concentration, for example, a filter is chosen with as large a pore size as possible to effect rapid flow, with the concomitant loss of smaller molecules. An additional problem with filtration is pore clogging by particulate material, necessitating rapid stirring which may cause denaturation. With lyophilization, all solids including salts are concentrated thereby making subsequent dialysis necessary. In concentrating very dilute solutions, solids are lost into vacuum systems in the form of small particles entrained in the stream of water vapor. The concentration of macromolecules by means of dried, highly cross-linked gels requires some method for eluting concentrated protein from the interstices of the gel particles and washing and drying the gels for recovery of the product. Scaling problems are also encountered with some of these methods, and the same equipment is not, in each instance, adaptable to small and large quantities of starting material.

Another prior art process is the process of dialysis. By this process higher molecular weight substances are separated from lower molecular weight substances in solution by the greater diffusibility of the smaller molecules through a semipermeable membrane. One commonly-used device employs cellophane membranes having large surface areas for the separation of impurities from blood during kidney failure. However, dialysis processes do not remove the solvent or suspending medium from the macromolecules. It only serves the purpose of removing smaller molecules and salts from solution. Dialysis with a concentrated macromolecule solution outside is, however, used to concentrate proteins inside the membrane but ceases to be effective when the colloid osmotic pressure is the same on both sides of the membrane.

SUMMARY OF THE INVENTION

It is thus an object of this invention to provide a simple and effective process for concentrating macromolecules which are in solution or colloidally suspended in a solution.

It is a further object of this invention to provide a process which not only concentrates macromolecules but also substantially removes salts and small molecules as well as the solvent or suspending medium.

These as well as other objects are accomplished by placing a solution or suspension of macromolecules into a dialysis membrane container and immersing the container within a bath of the solvent or suspending medium and freezing the bath.

DETAILED DESCRIPTION

According to this invention it has been found that macromolecules may be concentrated by an extremely effective and yet simple process. Macromolecules are generally found in dilute solutions or as low concentration colloids. By the process of this invention macromolecules are concentrated by using conventional dialysis membranes as means for effecting the concentration. The solution or colloidal dispersion is placed in such a membrane and immersed in a bath of the solvent or suspending medium. Preferably the bath is near the freezing point of the solvent or suspending medium at the time of immersion. To complete the process, the bath is simply frozen around the membrane. After removing the membrane from the frozen bath the observed volume reduction is remarkably surprising. Generally only about four to six volume percent of the original sample remains after the process.

For purposes of clarification, the term "prime liquid" is used within this disclosure to cover the beginning liquid used in the process of this invention. Such prime liquid is then comprised of a solvent and/or suspending liquid and macromolecules as a solute or colloid.

As used within this disclosure the term "macromolecule" means a substance of sufficiently high molecular weight to not diffuse through a dialysis membrane. For most purposes macromolecules are defined as having a molecular weight above 10,000 daltons. Such macromolecules include proteins, polysaccharides, viruses, and nucleic acids. Some of these molecules are found to exist in solution while others tend to be colloids or aggregate molecules. However, the process of this invention is applicable to such molecules regardless of how they are associated with a solvent or suspending medium.

The types of suspending mediums or solvents for such macromolecules are virtually unlimited. As applied to biological and biochemical concentrations such solvents or suspending mediums comprise water, plasma, tissue culture media and a variety of buffers. However, other such solvents or suspending mediums may include organic solvents, alcohol solutions, dimethyl sulfoxide, or mixtures thereof.

The process of this invention is thus applicable to many types of biological and biochemical concentrations. Such applications of this process include concentrating serums and vaccines. Other applications include concentrating viruses, antigens and antibodies in urine. Nonbiological applications include concentrating polluted water for study of the pollutants contained therein. In all of these applications water is the basic solvent and suspending medium and is thus used as the material for the freezing bath.

The dialysis membrane materials used in the process of this invention may be any of the conventional materials used in the prior art process of dialysis. Such materials include nonmoisture proof cellophane, reconstituted cellulose, viscose cellulose and collodion (nitrocellulose) membranes. Such membranes are sold commercially as sausage casings. Details of the preparation of such membranes are given in U.S. Pat. Nos. 1,803,622; 2,043,172; 2,477,767; 2,477,768; 2,521,101; 2,999,756; and 3,041,736. Canadian Pat. No. 361,918 and an article by Ettisch, et al., *Biochem. Z.* 248, 65-6 (1932) also describe processes for preparing such membranes.

The actual physical steps of the process are quite simple. Dialysis membranes are normally in the form of flexible tubing having a diameter on the order of 0.8 centimeter when filled. The sample is placed inside the tubing and the tubing closed off by tying a knot. Of course, other membrane geometries and closing methods may be used, such as a pocket formed of two rectangular membrane sections.

The closed off sample is then immersed in a bath of the solvent or suspending medium. The bath is preferably at or near its freezing point. This is best achieved by having the bath consist essentially of the solid phase in equilibrium with the liquid phase such as an ice water mixture. However, the initial bath temperature is not critical. Having the initial bath near its freezing point merely serves to speed up the freezing step. Freezing of the bath is accomplished by placing a container of the bath inside a freezer which is maintained at a temperature approximately 5° to 10°C. below the freezing point of the bath. However, cooling coils may also be installed within the bath container to cause freezing. With small samples, e.g., less than 300 milliliters, it has been found that plastic containers are desirable to retard too rapid freezing. If the bath is frozen too rapidly, the concentration may not be extended to the degree which could have been achieved had the bath been frozen more slowly. But at any rate, a high degree of concentration will be achieved. An overall freezing time of about three hours has been found to be satisfactory.

When freezing has been achieved, the membrane containing the concentrated macromolecules is removed from the bath preferably by thawing and physically removing, being careful not to damage the membrane. The membrane should not be left in the thawed bath for an extended period of time, e.g., a week, because the process is somewhat reversible and some dilution could occur.

Having generally described the process of this invention, the following nonlimiting theory of the mechanisms involved is given as a further aid to the understanding thereof. When the membrane is first placed in the bath, normal dialysis occurs, i.e., salts and small molecules pass through the membrane because of the concentration gradient. Macromolecules are retained within the membrane because they will not pass through the membrane pores. As freezing occurs in the bath, salts and small molecules are excluded from the solid phase, as one would expect from a simple eutectic system. The salts and small molecules are swept away from the membrane by convective currents created by the freezing process and temperature differentials. As the solid phase begins to impinge upon the membrane, the liquid surrounding the membrane is immobilized thereby. This retards additional loss of salts and small molecules by diffusion since the concentration gradient is now reduced. Since additional salts, small molecules and macromolecules are retained within the membrane, the liquid within the membrane has a reduced freezing point due to the solutes therein. Thus, freezing occurs around the membrane but not within. When solid substantially surrounds the membrane, the molecules of the liquid within the membrane continue to diffuse through the membrane to be solidified upon reaching the outside. This further increases the freezing point differential due to the increased concentration within the membrane. The driving force is reduction in free energy by solidification. Another phenomenon comes into operation while the liquid is within the pores of the membrane. One might expect freezing to occur within the pores since solutes have been left behind. However, there is a freezing point depression associated with liquid being confined to a capillary. This depression is generally given by the expression $$\Delta T \sim (300 \cos\theta/a)$$

where $\theta$ is the wetting contact angle between the liquid and capillary wall, and $a$ is the capillary diameter in angstroms. Thus, with the process of this invention the freezing point depression is about 1° to 10°C. with complete wetting.

With the above theory in mind, it has been found advantageous to add a slowly dialyzing substance to very dilute solutions, e.g., much less than about 1%, so as to increase the freezing point differential. An addition of 1 to 2 wt. % sucrose has been found to be satisfactory for this purpose.

As a slight modification, the process of this invention may also be carried out by using a vertically oriented membrane while directionally freezing from the top of the bath. In this manner, salts and molecules are removed from the bottom section of the membrane while liquid is being lost from the top to the surrounding solid phase.

Once this process is completed, it is readily apparent that it may be repeated to achieve further concentration. Retained salts and small molecules may be further removed by conventional dialysis by simply changing the bath medium without having to change the sample membrane container. The thus concentrated macromolecules, such as protein antigens may thus be identified and further separated by affinity chromatography and used for immunological analysis. The following specific examples are given as a further illustration of the process of this invention.

EXAMPLE I 250 ml of urine was placed into a regenerated viscose cellulose tubing ("Visking" sausage casing 8/100) 0.8 mm in diameter × 100 feet in length, folded into parallel sections about 2 inches long and placed into a 0.5 liter container having ice slush therein, then placed in a freezer at −20°C. for 18 hours. The tubing on thawing was found to contain 10 to 15 ml of concentrate. The concentrate was a clear yellow solution containing, depending on the origin of the urine, up to 0.5% protein.

EXAMPLE II

Two liters of urine were placed in the dialysis tubing described above. Four stainless steel beakers of 1 liter volume were partially submerged in an antifreeze refrigerant bath maintained at −6°C. After the tubing was in place, the stainless steel container was filled with ice slush. The temperature was monitored with a thermistor in the middle of the liquid together with a suitable recorder.

The temperature remained at 0°C for 6 hours while the external water froze, then fell slowly to −6°C. over a period of three hours. A cooling rate of about ½°/hr. appeared to be satisfactory. With two stages of concentration the total volume was reduced to 10 ml of clear yellow protein concentrate.

Since the volume reduction achieved by using the process of this invention was much greater than would be expected, an experiment was run to see if a synergism existed. Distilled water was placed inside a dialysis membrane and placed in a water bath and frozen as described in the above examples. Only about one-half of the distilled water was lost. The process of this invention thus appears to produce a synergistic result.

What is claimed is:

1. A process for concentrating macromolecules, comprising the steps of:

enclosing a prime liquid containing said macromolecules as a solute or suspension within a dialysis membrane;

immersing said membrane within a bath of the solvent or suspending medium of said prime liquid;

freezing said bath; and removing said membrane containing concentrated macromolecules from the frozen bath.

2. The process according to claim 1 wherein said membrane is composed of a member selected from the group consisting of nonmoisture proof cellophane, reconstituted cellulose, viscose cellulose, and nitrocellulose.

3. The method according to claim 1 wherein said prime liquid is selected from the group consisting of urine, plasma, serum and vaccines.

4. The method according to claim 1 wherein said prime liquid is urine, said macromolecules are protein and said bath is water.

5. The method according to claim 4 wherein said water is at 0°C at the time of immersion and said step of freezing covers a time period of about 3 hours.

* * * * *